United States Patent [19]
Funk et al.

[11] Patent Number: 5,901,300
[45] Date of Patent: May 4, 1999

[54] CONTROL STORE ADDRESS STOP

[75] Inventors: Mark Robert Funk, Rochester, Minn.; Harold Eugene Frye, Poughkeepsie, N.Y.; Lynn Allen McMahon; Bruce Ralph Petz, both of Rochester, Minn.

[73] Assignee: International Business Machines Corporation, Armonk, N.Y.

[21] Appl. No.: 08/153,540

[22] Filed: Nov. 15, 1993

Related U.S. Application Data

[63] Continuation of application No. 07/504,398, Apr. 3, 1990, abandoned, which is a continuation of application No. 07/169,517, Mar. 17, 1988, abandoned.

[51] Int. Cl.⁶ .................................................. G06F 9/06
[52] U.S. Cl. ............................................................ 395/376
[58] Field of Search ................................... 395/376, 425, 395/575, 725, 775, 800; 371/15.1, 16.1, 17, 18

[56] References Cited

U.S. PATENT DOCUMENTS

| | | | |
|---|---|---|---|
| 3,411,147 | 11/1968 | Packard | 364/200 |
| 3,786,365 | 1/1974 | Jen | 364/200 |
| 3,813,531 | 5/1974 | King et al. | |
| 3,909,802 | 9/1975 | Cassarino et al. | 371/17 |
| 3,937,938 | 2/1976 | Mathews | |
| 3,941,989 | 3/1976 | McLaughlin | 364/900 |
| 4,034,194 | 7/1977 | Thomas et al. | 371/29.1 |
| 4,095,268 | 6/1978 | Kobayashi et al. | 364/200 |
| 4,275,441 | 6/1981 | Takeuchi | 364/200 |
| 4,392,208 | 7/1983 | Burrows et al. | 364/900 |
| 4,422,144 | 12/1983 | Johnson et al. | 364/200 |
| 4,435,761 | 3/1984 | Kimoto | 364/200 |
| 4,482,953 | 11/1984 | Burke | |
| 4,498,130 | 2/1985 | Uchida | |
| 4,530,050 | 7/1985 | Fukunaga et al. | 364/200 |
| 4,545,030 | 10/1985 | Kitchin et al. | 364/900 |
| 4,570,218 | 2/1986 | Debesson | 364/200 |
| 4,571,677 | 2/1986 | Hirayama et al. | 364/200 |
| 4,589,065 | 5/1986 | Auslander et al. | 364/200 |
| 4,598,364 | 7/1986 | Gum et al. | 364/300 |
| 4,638,452 | 1/1987 | Schultz et al. | 364/900 |
| 4,758,945 | 7/1988 | Remedi | 364/200 |

OTHER PUBLICATIONS

IBM TDB vol. 20, No. 6, Nov. 1977 p. 2193, "Data Processor Fault Analysis Assist" by C. Cuffaro, L. D. Howe, Jr. and F.A. Zurla, Jr.

IBM TDB vol. 29, No. 12, May 1987 pp. 5334–5337, "Microcode Transparent Virtual Control Store Addressing" by M. R. Funk, L. A. McMahon, B. R. Petz and C. B. Stunkel.

*Primary Examiner*—David Y. Eng
*Attorney, Agent, or Firm*—Hugh D. Jaeger; Owen J. Gamon

[57] ABSTRACT

A system for stopping the operation of a data processing system executing control words stored in a read/write control word storage device. A special control word is stored at the control storage address where it is desired to stop operation of the processor and the regular control word at that address is stored in a service processor memory. When the control storage address containing the special control word is reached, the special control word causes the system clock to be inhibited, thereby stopping the execution of control words, an indication that the processor has been stopped is generated, and the regular control word is restored to the control word storage device from the service processor memory for resumption of system operation.

8 Claims, 4 Drawing Sheets

CONTROL STORE ADDRESS STOP

The present application is a continuation of U.S. patent application Ser. No. 07/504,398, filed Apr. 3, 1990, now abandoned, which in turn is a continuation of U.S. patent application Ser. No. 07/169,517, filed Mar. 17,1988, now abandoned.

TECHNICAL FIELD

This invention is directed to a data processing system having hardware operating under the control of control words stored in a control word storage device. The invention provides means for stopping operation of the system at control storage addresses selected by the operator, signalling to the operator that the processor has been stopped, and resuming operation in response to an operator generated signal.

The development of microprogrammed data processing systems, particularly that class of system which utilizes hardware which is directly under the control of microinstruction, requires that the status of the system at the end of a particular instruction be capable of analysis for the purpose of diagnosing and locating faults which may be due to either faulty hardware or programming errors. This task has become more and more difficult due to the increasing complexity of the interface between the microinstruction and the hardware of the data processing system. Elaborate testing and verification procedures are commonly used to identify errors, correct them and verify the accuracy of the "fix".

The process of hardware development and of writing and testing software, in, particular that class of software considered to be "microcode", can be greatly facilitated by providing the programmer with the ability to stop the execution of the program to permit analysis of various registers, system storage locations, etc. in an attempt to determine the nature of the programming error.

BACKGROUND ART

U.S. Pat. No. 4,933,847 application Ser. No. 07/121,443, filed Nov. 17, 1987, "Microcode Branch Based of Operand Length and Alignment" is incorporated in this patent by reference.

One commonly employed technique for debugging software is the use of "breakpoints" which are set by changing the operation code byte of an instruction to a special breakpoint instruction, or simply to an invalid instruction. When this point in the program is reached, a trap is performed to a software routine which notifies the operator that the breakpoint has been reached and may additionally function to save the contents of some specified registers. This technique suffers from the disadvantages that the processor does not stop, and therefore it is not possible to perform a comprehensive analysis of the state of the system at the time of the stop.

Another technique is implemented with special purpose hardware which compares a desired stop address with the current control store address. When the hardware detects identity between the current control store address and the desired stop address, the system is brought to a halt. This overcomes some of the limitations of the system previously described, but nevertheless suffers from the inability to specify a plurality of stop addresses. Additionally, if the control store address specified is one from which an overlaid control word is executed, many false stops will result.

While it is desirable to have a service processor handle such control store stops, the service processor is not commonly attached directly to the system processor (CPU), and therefore does not have the ability to determine the current control store address nor can it inhibit the processor clock to stop the system.

U.S. Pat. No. 3,813,531 described a system in which switches connected to the instruction register may be set to a bit pattern corresponding to the instruction type to be tested. When this instruction type is present in the command or operation code register, the comparison circuit causes the system to come to a halt. This system lacks the capability of specifying the control storage address at which the system is to be stopped.

U.S. Pat. No. 4,095,268 relates to a microprogrammed system in which start and stop signals from a control console are used to start and stop operation of the system. When the system is stopped, it is possible to write selected data into specified addresses for analysis. This system does not accommodate the stopping of the system at a particular microinstruction address.

U.S. Pat. No. 4,422,144 describes a microprogrammed data processing system in which microinstructions stored in a writable control storage element may be substituted for defective microinstructions found in the read only storage element. A provision is made for the substitution of the valid microinstruction for the invalid microinstruction based on the existence of a data bit in a halt array. This array is accessed with the same address as the microinstruction and the detection of a binary one, previously stored by service personnel, causes the alternate microinstruction from the writable control storage to be executed. This system does not bring the system to a halt and contains no provision for the storage of the microinstruction originally at the control storage address where it is desired to halt.

U.S. Pat. No. 4,275,441 describes a microprogrammed processing system in which the processor can be operated a single step at a time. There is no ability to stop at a particular microinstruction address.

U.S. Pat. No. 4,392,208 describes a data processing system in which an address register may be set to an address at which it is desired to stop the system. When an address comparison circuit detects equivalence between the address used for control storage access and the desired address, the system is brought to a halt. This system does not provide for the substitution of a clock stop instruction for the normal microinstruction at the selected address in control storage.

U.S. Pat. No. 4,545,030 relates to a power conservation system for a microprocessor based system. The system is placed in the "on" state in response to various control signals such as I/O generated interrupts and placed in the "off" state in response to corresponding completion signals. There is no provision for stopping the system in response to access of particular addresses in control storage.

U.S. Pat. No. 4,530,050 describes a data processing system having a processor which is capable of executing variable length instructions. The error detection system described in the patent does not provide means for bringing the system to a halt in response to the accessing of a particular address in control storage.

U.S. Pat. No. 4,571,677 describes a tracing system for detecting the equivalence of a predetermined memory address with the current address in the memory address register of the CPU. The system does not describe means for substituting a stop clock instruction for a microinstruction at a predetermined address.

U.S. Pat. No. 4,570,218 describes a system for the transfer of data between a peripheral device and a microprocessor memory utilizing direct memory access and programmable stop codes written into data memory. There is no teaching of a system in which microinstructions are removed from control storage and replaced with clock stop instructions.

U.S. Pat. No. 4,589,065 describes a Primitive Instruction Set Machine having a trap instruction which provides a one cycle method for checking a condition and continuing execution of the instruction stream in parallel. The patent does not describe a system in which a microinstruction at a desired address is replaced with a clock stop instruction.

U.S. Pat. No. 4,598,364 describes a tracing system in which the trace instructions are permanently lodged in the program and may be selectively enabled by displacement bits. There is no description of a system which allows a microinstruction at a desired control storage address to be replaced with a stop clock instruction and subsequently restored to control storage.

U.S. Pat. No. 4,638,452 describes a data processing system in which debugging is accomplished with the aid of breakpoints which may be selectively acted upon in accordance with the nature of signals received from a peripheral device. There is no description of a system in which a microinstruction in control storage is replaced with a stop clock instruction.

U.S. Pat. No. 4,638,452 relates to a real time interrupt system microprocessor. The interrupt interval is based on the passage of real time and is not dependent on the control storage address.

*IBM Technical Disclosure Bulletin*, "Data Processor Fault Analysis Assist", Vol. 20, No. 6, November, 1977, p. 2193, describes a microprogrammed system which can be stopped at the end of a preselected microinstruction by means of an address matching mechanism. The system provides the ability to achieve the stop at any one of the plurality of clock pulse intervals. There is no description of a stop instruction which replaces the instruction at the preselected stop point.

*IBM Technical Disclosure Bulletin*, "Microcode Transparent Virtual Control Store Addressing", Vol. 29, No. 12, May, 1987, pp. 5334–5337, describes a system for determination of whether a normally non-resident module is resident in control storage, transparent to the microcode. The system described is used in the implementation of the invention described and claimed herein. The description in the TDB publication will be helpful in understanding the application of this invention to a system with virtual addressing of microcode.

SUMMARY OF THE INVENTION

A primary object of this invention is to provide a stop mechanism for a microprogrammed data processing system which overcomes the shortcomings of prior art systems.

It is another object of the invention to provide a stop mechanism for a microprogrammed data processing system which allows the operator to specify one or more microinstructions at which operation of the data processing system is stopped.

It is still another object of the invention to provide a stop mechanism for a data processing system in which a stop clock instruction is substituted for the microinstruction at the control storage address where it is desired to stop the system.

Still another object of the invention is to provide a stop mechanism for a data processing system in which the system is stopped at the specified microinstruction, the operator is notified that the stop point has been reached, and the system is readied for restarting.

Yet another object of the invention is to provide a clock stop mechanism for a microprogrammed data processing system having a read/write control storage device which includes an overlay area which may contain different groups of microinstructions.

A further object of the invention is to provide a stop clock instruction for a microprogrammed data processing system. The stop clock instruction is substituted for the microinstruction at the point where it is desired to stop the system. When instruction decode logic senses the presence of a stop clock instruction, the system clock is stopped and the original microinstruction is reloaded into control storage from the system storage unit. A service processor is interconnected with the data processing system in a fashion which allows the system latches, implemented by LSSD, to be directly interrogated.

These and other objects, features, and advantages are realized by a data processing system having a microprogrammed processor, implemented in LSSD logic, which executes a program consisting of microinstructions stored in a read/write control storage unit. When the operator wishes to run a program and stop it at a selected point, that is, a specified microinstruction, a stop clock instruction will be stored at the address in control storage occupied by the specified microinstruction. The specified microinstruction will be temporarily stored in the service processor storage unit at an address contained in the stop clock instruction. When the system executes the program and encounters the stop clock instruction, the instruction decode logic operates to inform the operator that the clock stop instruction has been reached and the system has been stopped. The decode logic also operates to effect a system storage access at the address specified by the clock stop instruction to retrieve the original microinstruction and replace it in the current address in control storage. The operator can interrogate various registers in the system as a part of the debugging procedure.

When this has been completed, the operator can generate a restart signal which causes the system to execute the microinstruction for which the clock stop instruction was substituted, again replace the original microinstruction with the clock stop instruction and perform the housekeeping associated with this replacement, and continue with execution of instructions until the program has completed or a further clock stop instruction is encountered. Since each clock stop instruction has associated with it a particular address for the substituted microinstruction, the fact that the control storage address may contain an overlay module is easily accommodated by including a table in storage which indicates which overlay modules are currently resident. If the overlay is currently resident, the corresponding resident control word is also modified. The details of handling an overlay module do not form a part of this invention. Such details are therefore not included in this description. A complete description of the handling of an overlay module is contained in the *IBM Technical Disclosure Bulletin* article "Microcode Transparent Virtual Control Store Addressing" cited above and incorporated herein by reference.

Since, for economic and performance reasons, the control storage unit is generally not large enough to contain all the microinstructions required for all the machine features, some areas of control storage are reserved for overlays. An overlay is a group of microinstructions which may be moved in and out of control storage as the situation demands. It will generally be a group that relates to a machine function that is less frequently used, such as floating point instructions. A control word in an overlay area of control storage will contain, at any given time, one of several possible overlay microinstructions. All of the overlay microinstructions are stored in an overlay portion of main storage, referred to as overlay storage. When the system requires the execution of an overlay microinstruction, and the required microinstruction is not currently resident in control storage, the hardware traps to a microcode routine which loads the required microinstruction into control storage and then branches to it. In practice, a group of microinstructions, termed an overlay module, is transferred. Main storage locations accessible to the service processor contain an indication of which overlay modules are resident in control storage.

Since microinstructions in overlay areas of control storage are loaded by microcode, a clock stop instruction placed in these area by the service processor might be overlaid before being executed. Thus, the corresponding microinstruction in overlay storage must be changed to a clock stop instruction by the service processor.

DESCRIPTION OF THE INVENTION

Figure 1A:
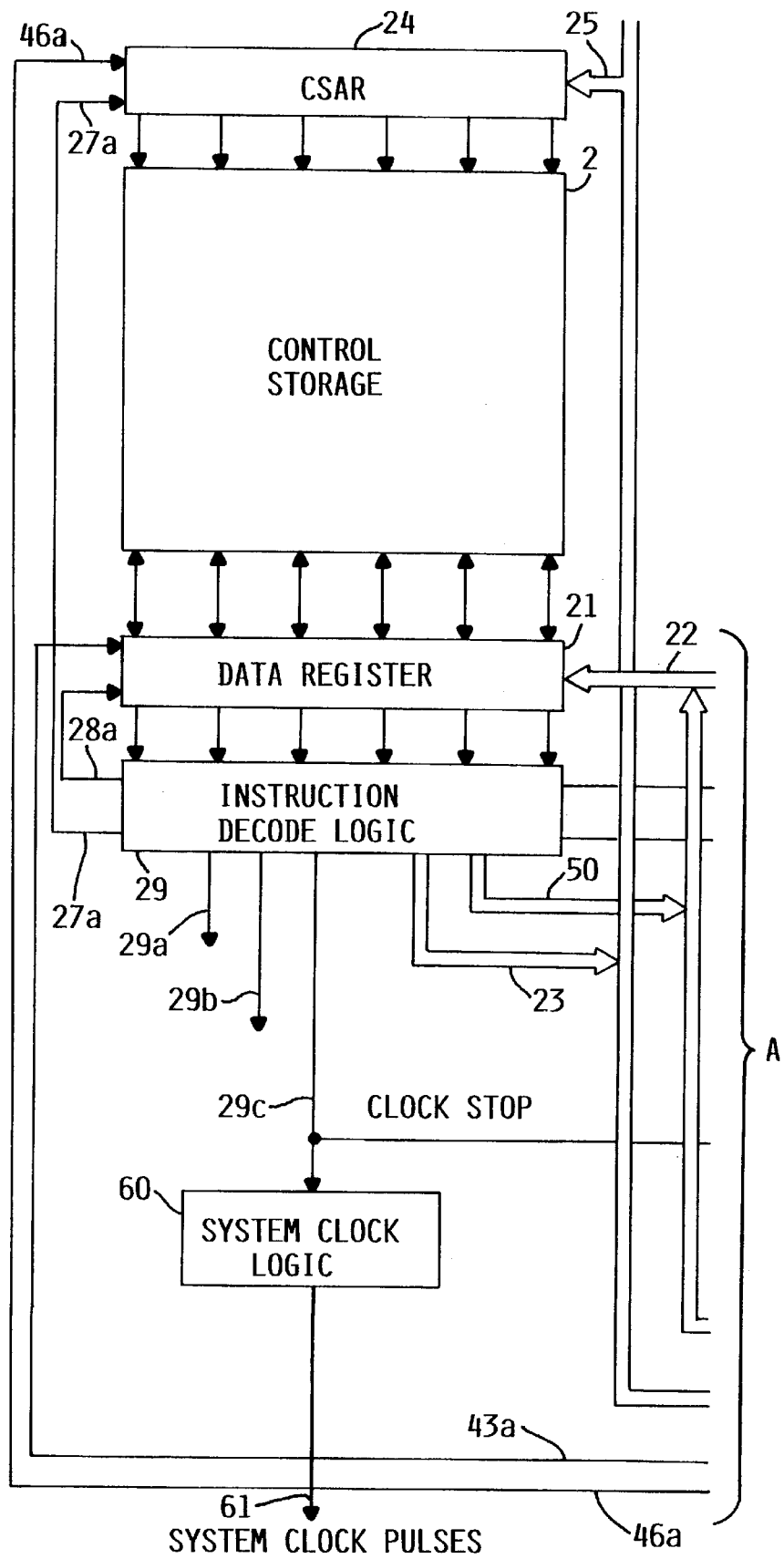
FIG. 1 is a schematic block diagram of the relevant portions of a microprogrammed data processing system incorporating the invention.
Figure 1B:
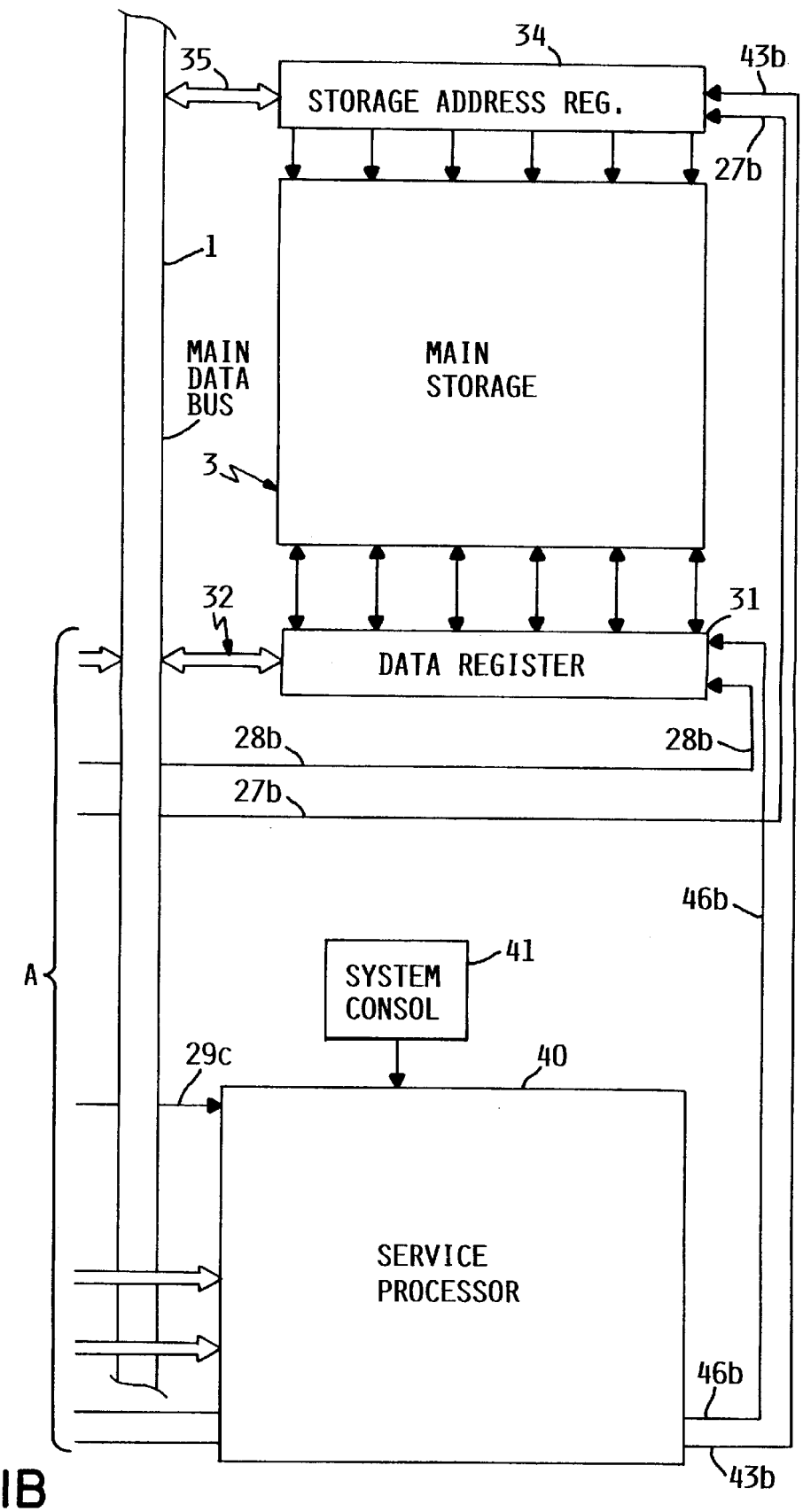

The block diagram of FIG. 1 illustrates the components of the invention as used in a microprogrammed data processing system implemented in LSSD logic. It will be appreciated that the simplified diagram shows only those components of the data processing system which interact directly with the hardware and software aspects of the invention. Since the components shown are included in, or easily added to, all microprogrammed processors, the invention is adapted for use in a wide variety of processing systems.

The microprogrammed data processing system shown in FIG. 1 and incorporating the invention has a main data bus 1 which may be connected to the data and address registers associated with the main storage device 3. For example, data on main data bus 1 may be gated into data register 31, serving as an input and output data register for main storage unit 3, by means of a connecting data bus 32 and a control line 286 extending from service processor 40.

Service processor 40 is a microprocessor which is dedicated to performing various internal functions for the microprocessing system associated with main data bus 1. The service processor can communicate with a system console 41, having a keyboard and display. The service processor is largely confined to performing housekeeping tasks for the system, such as reading selected registers within the data processing system and determining the status of LSSD latches located throughout the system. It utilizes a separate clock and therefore is able to function even when the system clock is inhibited. While the preferred embodiment of the invention uses a service processor to perform many of the clock stop functions, it will be appreciated that dedicated logic could also be used without departure from the invention.

Microinstruction address may be supplied to control store address register 24 from service processor 40 via data bus 25 under the control of a signal over line 46 from service processor 40. It will be appreciated that the microprocessor system will have other means for supplying addresses to bus 25 for use in control store address register during the normal operation of the system. This being the case, there will be additional lines and sources of address information associated with bus 25 and control store address register 24. For example, during the execution of certain instructions, it may be necessary to gate data from the instruction decode logic 29 over data bus 23 onto data bus 25 and into the control store address register 24. This gating action is accomplished by means of a signal on line 27a generated by instruction decode logic 29.

The instruction decode logic 29 is connected to the control storage data register 21 and will respond to the content of this register, in most cases a microinstruction read from control storage 2, to generate the appropriate control signals on instruction signal lines 29a, 29b and 29c in response to the operation code portion of the microinstruction. It will be appreciated that various instruction formats may be used without departing from the scope of the invention. The characterization of a portion of the instruction as an operation code is simply for the purpose of illustration and is intended to identify that portion of the instruction which coacts with the instruction decode logic 29 to generate the logic signals unique to the individual instructions. For the purpose of this description the signals on lines 29a and 29b may be ignored. The signal on line 29c is the clock stop instruction of this invention and is generated when the storage location in control storage 2 accessed by the address in control storage address register 24 contains a microinstruction of the class identified as a clock stop instruction.

Since the execution of various classes of instructions may require that data be transferred into control storage address register 24 from a source within the system processor, instruction decode logic generates a signal on line 27c for this purpose. A signal from instruction decode logic 29 on line 27a effects the transfer from a source within the system to control store address register 24 over bus 25. Similarly, control lines 28b and 27b effect the transfer of data between main storage data register 31 and main data bus 1 over data bus 32 and main storage address register 34 and main data bus 1 over data bus 35, respectively.

A data bus 50, extending from instruction decode logic 29 to main data bus 1, effects the transfer of a portion of the microinstruction in data register 21 to the main data bus 1. Such transfers are required in the case where a portion of the microinstruction is used as an address for main storage 3. It will be appreciated that such a transfer could also be effected by selective gating from data register 21 to data bus 1 over the data bus 22.

The clock stop signal on line 29c from instruction decode logic 29 is supplied to the system clock logic 60, which generates system clock signals on line 61 to the various timing and control circuits throughout the data processing system. While but a single line is shown, it will be appreciated that systems commonly require a plurality of spaced clock signals for each machine cycle and the representation is intended to cover such systems. The signal on line 61 effects an orderly shut down of the processing system.

The clock stop signal on line 29c is also supplied to the service processor 40. When the signal is received, the service processor reads the current address in the control storage address register 24 and scans a table in service processor storage, not shown, to locate the instruction which was replaced by the clock stop instruction. In response to a control signal generated by the service processor on line 43a, this instruction is then transferred from the service processor storage unit to the control store data register 21 over data bus 22a leading from the service processor 40 to data bus 22, and stored at the location from which it was originally read, that is, the address which currently exists in the control storage address register 24. If this control storage address is an overlay address, the corresponding location in overlay storage is also replaced.

The service processor then operates to send an indication of the clock stop signal to the console 41 where it can be observed or heard by the operator. The operator, by means of the service processor 40, is able to interrogate various internal registers on the data processing system and determine the status of the LSSD latches in the system. Analysis of this information will generally permit an identification of the fault or problem and lead to a solution.

At this point, the system is ready to resume operation, beginning with the instruction originally at the current address and at which point the system was stopped.

Figure 2A:
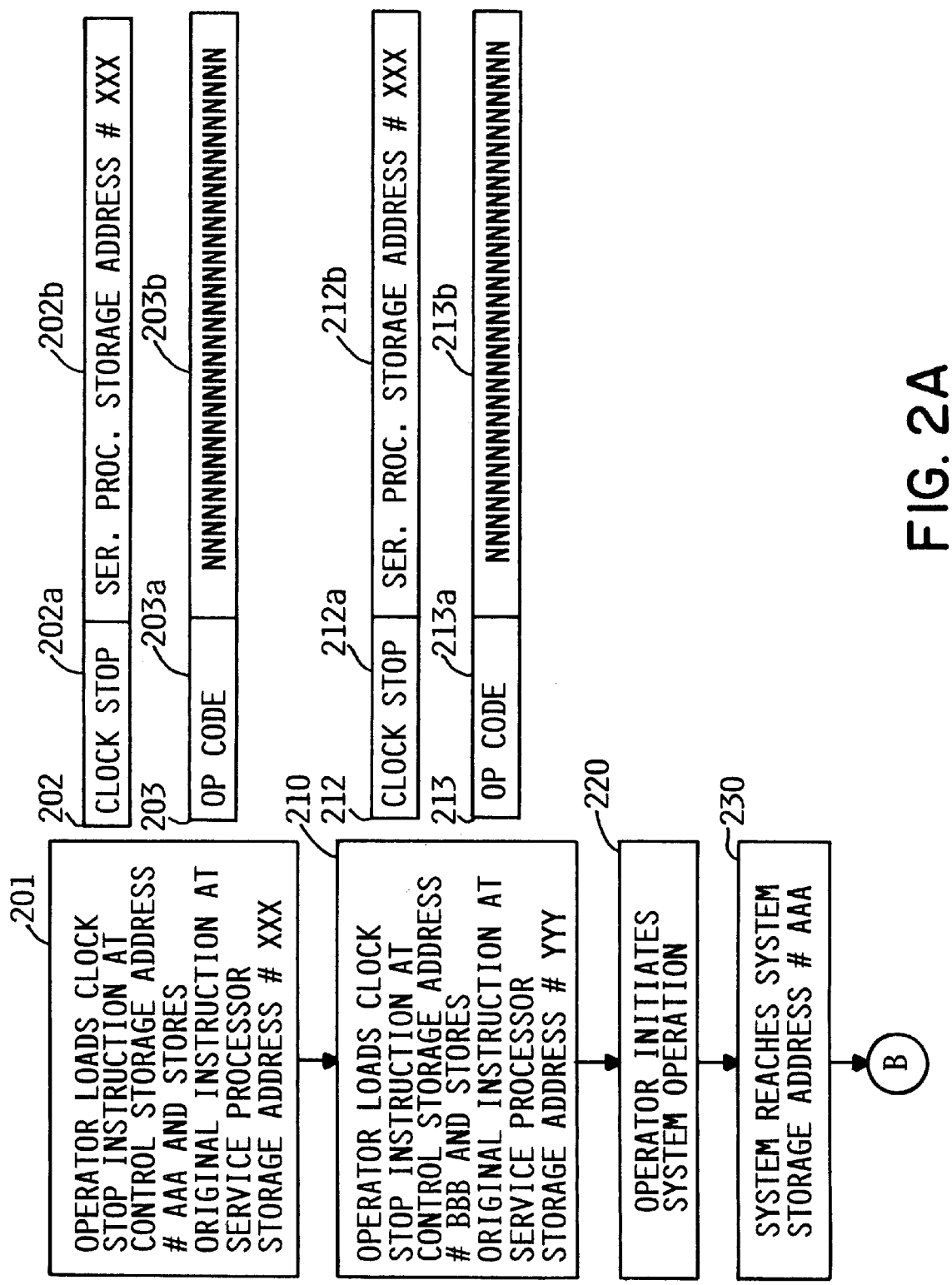
FIG. 2 is an annotated data flow diagram showing the steps executed by the system during execution of the instruction.
Figure 2B:
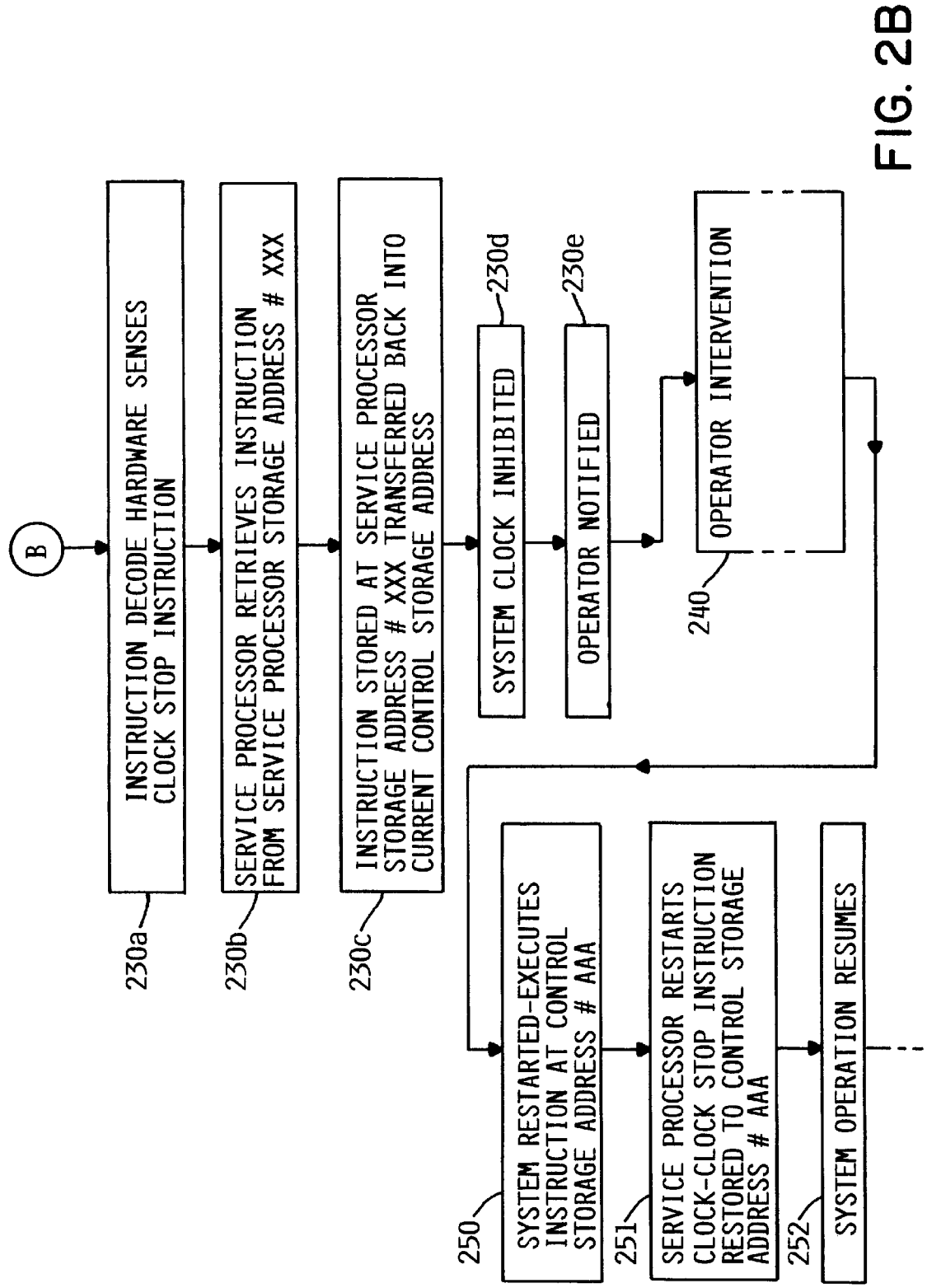

The details of operation of the system during the preparation for, and execution of, the clock stop instruction are evident from the showing in FIG. 2. The system operator, who would normally be an experienced system designer or programer, expert in systems control programming and working on debugging a system's control program consisting of a sequence of microinstructions, would select a particular sequence of microinstructions for analysis. The microinstructions are those loaded in the control storage unit 2 of FIG. 1. At the end of the particular sequence to be analyzed, after the last of the microinstructions in the sequence at control storage address AAA, the operator would load a clock stop instruction as shown in block 201 of FIG. 2. Loading the clock stop instruction at control storage address AAA causes the microinstruction originally at that location to be transferred to service processor storage at address XXX. The format of the clock stop microinstruction is shown in block 202. The instruction includes an operation code portion 202a and a service processor storage address portion 202b. It will be noted that the system storage address is that at which the original microinstruction is placed. The clock stop microinstruction may contain such additional information as may be required by the particular system on which the instruction is implemented, but in all events it will include a portion which serves as an operation code and a portion which serves to address system storage.

The microinstruction originally at control storage address AAA is shown in block 203. Similar to the clock stop instruction, it includes an operation code portion and an additional portion designated as NNN-NN. The additional portion may represent a storage address or register within the data processing system.

If the control storage address AAA is used for overlay, the corresponding microinstruction in overlay storage must be modified instead of the resident instruction if that overlay is not currently resident and in addition to the resident instruction if it is present in control storage.

As pointed out earlier in the description of the invention, the operator may wish to place several clock stop instructions in the control storage at the same time. The loading of a second clock stop instruction is set forth in block 210. The second instruction is loaded at control storage address BBB and the original instruction at that address is stored at address YYY in the service processor storage unit. The format of the second clock stop instruction is shown in block 212. The instruction has an operation code portion 212a and a storage address portion 212b. The original microinstruction 213 has an operation code portion 213a and additional portion NNN, which, as was the case with the instruction 202, can represent a storage address, register, or other information needed for execution of the particular operation code.

The addresses selected for storage of the original microinstruction will generally lie within an area of service processor storage set aside as a dedicated buffer. Each storage location in the buffer will contain the original microinstruction and the address at which it was originally stored. As will be later discussed in more detail, when the service processor 40 receives an indication over line 29c that a clock stop instruction exists in the control store data register 21, the address in control store address register is compared to the addresses in the buffer area until a match is found. The instruction corresponding to the matched address is then transferred back to the control store data register 21 to be written back into control storage at the original address.

Having loaded the clock stop instructions at the desired locations in the control storage unit 2, and loading the original microinstructions into the buffer area in the storage of service processor 40, the operator initiates operation of the system as shown in block 220.

The data processing system begins execution of the program, reading the microinstructions from control storage 2, loading them into control storage data register 21, and decoding the microinstruction by means of the instruction decode logic 29. The reading, interpreting and execution of microinstruction continues until control storage address AAA is reached as shown in block 230. This is the address of the first clock stop instruction.

The clock stop instruction is read from control storage and decoded by the instruction as depicted by the block 230a. The instruction decode logic, in conjunction with the service processor 40, operates to retrieve the original microinstruction which is now stored at service processor storage address XXX. As previously described, the service processor and instruction decode logic operate to gate the portion of the clock stop instruction representing the service processor buffer storage address, from the control storage data register 21 to the service processor 40 over data bus 23.

The original microinstruction is then read from the system storage at address XXX and placed on the bus 22a leading to the bus 22 and the control store data register 21 as depicted in block 230b. The original microinstruction is then reloaded into the control storage 2 at the same address from which it was originally taken. Since no change had been made to the address value in the control storage address register 24, the original microinstruction is loaded into the current address, that is, the one which held the clock stop instruction and which is the same address from which the instruction was originally removed. If this address is used for overlay instructions, the corresponding instruction in overlay storage must also be replaced.

At this point the clock stop signal on line 29c, which is connected to the system clock logic 60, causes the generation of clock pulses on line 61 to be inhibited, brining the system to an orderly halt as depicted in block 230d.

The same signal leads to the service processor, and causes the service processor to generate a signal at system console 41 to notify the operator that the system has reached a clock stop instruction and stopped as shown in block 230e.

In the normal course of events, the operator will then intervene, performing some analysis of the system conditions in an effort to identify the problem being debugged. This analysis may include an examination of the contents of various registers in the system by means of the service processor, and may involve the logging of the data in various system storage locations, as well as the contents of selected LSSD registers and indicators, as shown in block 240.

The analysis of the status of the data processing system can be performed by the service processor 40 even though the system clock is inhibited since the service processor has an independent clock. The service processor will also have direct access to the various logic elements of the data processing system and does not require use of the system data bus for this purpose.

When ready to resume operation, the operator generates a start system signal from the system console 41, as depicted in block 250, and the system resumes operation with the single step reading and execution of the microinstruction at control storage location AAA as shown in block 250. As shown in block 251, the service processor then restarts the system clock and restores the clock stop instruction to control store address AAA. This allows the operator to duplicate the original run without the need for again manually inserting the stop clock instruction.

The system then continues to run, as shown in block 252, until the next clock stop instruction is encountered or other system action is taken.

We claim:

1. In a data processing system having a processor which executes control words stored in a read/write control word storage device, means for stopping said processor at a selected control word storage address, and restarting said processor at said selected address comprising:

a. a stop clock instruction having a field defining a storage address in a system storage device;

b. service processor means responsive to said system storage address portion of said stop clock instruction for retrieving a substituted control word from said read/write control word storage device at said selected control word storage address and storing said substituted control word at said system storage address;

c. means for executing said stop clock instruction stored in read/write control word storage, in place of said substituted for control word, at the selected address where it is desired to stop said processor;

d. said means for executing a stop clock instruction further including microinstruction decode means responsive to said stop clock instruction for inhibiting the operation of the system clock and thereby also the execution of control words by said processor; and e. said service processor means further including means coupled to said control word storage device for restoring said substituted for control word to said control word storage device at the address from which it was originally taken.

2. A system according to claim 1 wherein said storage address included in said stop clock instruction is directed to a storage device not served by said system clock.

3. A system according to claim 1 wherein said service processor has a clock that operates even when said system clock is inhibited.

4. A system according to claim 3 wherein said service processor includes means for reading registers in said data processing system when the clock for said system is inhibited.

5. A system according to claim 1 wherein said means for restoring said substituted control word includes means for restarting said processor at the control store address selected for stop.

6. A system according to claim 5 wherein a plurality of stop clock instructions are stored in said control store, serving to stop said processor at each control store address at which such instructions are stored.

7. A method for stopping the execution of a data processing program, comprising the machine executed steps of:

a. receiving an address of an instruction within said data processing program as a place to stop, said instruction being stored in a read/write control word storage device;

b. replacing said instruction with a stop clock instruction;

c. executing said data processing program up to but not including said stop clock instruction;

d. replacing said stop clock instruction with said instruction; and e. stopping execution of said data processing program.

8. A method according to claim 7, said replacing step b further comprising storing said instruction in system storage.

* * * * *